(12) United States Patent
Goynar et al.

(10) Patent No.: US 12,021,647 B2
(45) Date of Patent: Jun. 25, 2024

(54) CONTROLLED ACCESS TO PORTIONS OF A COMMUNICATION SESSION RECORDING

(71) Applicant: Avaya Management L.P., Durham, NC (US)

(72) Inventors: Sandeep Goynar, Pune (IN); Harsimran Jeet Singh, Pune (IN); Kiran Barhate, Pune (IN)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/678,548

(22) Filed: Feb. 23, 2022

(65) Prior Publication Data
US 2023/0269108 A1    Aug. 24, 2023

(51) Int. Cl.
*G06F 15/16* (2006.01)
*G06F 21/31* (2013.01)
*H04L 12/18* (2006.01)

(52) U.S. Cl.
CPC ......... *H04L 12/1831* (2013.01); *G06F 21/31* (2013.01); *H04L 12/1822* (2013.01); *H04L 12/1827* (2013.01)

(58) Field of Classification Search
None
See application file for complete search history.

(56) References Cited

U.S. PATENT DOCUMENTS

| | | | |
|---|---|---|---|
| 8,781,841 B1 * | 7/2014 | Wang | H04M 3/56 704/275 |
| 9,942,519 B1 * | 4/2018 | Pan | H04N 21/47 |
| 2010/0251142 A1 * | 9/2010 | Geppert | H04W 4/21 715/758 |
| 2011/0320958 A1 * | 12/2011 | Kashi | G06Q 10/1095 715/751 |
| 2013/0169742 A1 * | 7/2013 | Wu | H04L 12/1827 348/E7.083 |
| 2014/0280876 A1 * | 9/2014 | Wiklund | H04L 65/765 709/224 |
| 2018/0070050 A1 * | 3/2018 | Hansen | G09G 5/00 |
| 2018/0089636 A1 * | 3/2018 | Gatzke | G06Q 10/1095 |
| 2019/0260965 A1 * | 8/2019 | Morabia | H04L 65/1093 |

(Continued)

FOREIGN PATENT DOCUMENTS

WO    WO-03058934 A1 *  7/2003    ............. H04L 29/06

*Primary Examiner* — Phyllis A Book (57) ABSTRACT

The technology disclosed herein enables controlled access to portions of a communication session recording. In a particular embodiment, a method includes accessing a recording of user communications exchanged between participants over a communication session. The method further includes determining that a first participant subset of the participants is participating over the communication session during a first time and a second participant subset of the participants is participating over the communication session during a second time. A first user included the first participant subset is not included in the second participant subset. Upon receiving a request for the first user to access the recording, providing, to a first endpoint of the first user, a first portion of the recording corresponding to the first time and preventing access to a second portion of the recording corresponding to the second time.

20 Claims, 8 Drawing Sheets

(56) References Cited

U.S. PATENT DOCUMENTS

| | | | | |
|---|---|---|---|---|
| 2019/0268387 A1* | 8/2019 | Pelton | ............... | G06Q 10/10 |
| 2021/0342785 A1* | 11/2021 | Mann | ............... | G06F 40/18 |
| 2022/0086393 A1* | 3/2022 | Peters | ............... | G06V 20/41 |
| 2022/0377121 A1* | 11/2022 | Marchuk | ............... | H04L 65/60 |

* cited by examiner

Figure 8

CONTROLLED ACCESS TO PORTIONS OF A COMMUNICATION SESSION RECORDING

TECHNICAL BACKGROUND

Recordings of communication sessions have become an integral part of communication session services. Participants on a communication session (e.g., a conference call) may want to revisit something from the communication session (e.g., to refresh their memory) and, therefore, may playback a recording of the communication session. The recording may include audio exchanged between participants and/or may include other types of media exchanged over the communication session (e.g., video of the participants, presentation slides, chat communications, screen sharing, etc.). Often, the participants joined to a communication session may not be constant throughout the session. In those situations, access to the full recording of the communication session may not be desirable for a participant that was not present for the entirety of the communication session.

SUMMARY

The technology disclosed herein enables controlled access to portions of a communication session recording. In a particular embodiment, a method includes accessing a recording of user communications exchanged between participants over a communication session. The method further includes determining that a first participant subset of the participants is participating over the communication session during a first time and a second participant subset of the participants is participating over the communication session during a second time. A first user included the first participant subset is not included in the second participant subset. Upon receiving a request for the first user to access the recording, providing, to a first endpoint of the first user, a first portion of the recording corresponding to the first time and preventing access to a second portion of the recording corresponding to the second time.

In some embodiments, a second user included in the second participant subset is not included in the first participant subset, and the method includes upon receiving a request, from a second endpoint of the second user, providing, to the second endpoint the second portion of the recording and preventing access to the first portion of the recording.

In some embodiments, a third user is included in both the first participant subset and the second participant subset, and the method includes, upon receiving a request, from a third endpoint of the third user, providing, to the third endpoint the first portion of the recording and the second portion of the recording.

In some embodiments, the method includes authenticating the first user prior to providing the first portion of the recording.

In some embodiments, determining that the first participant subset is participating during the first time and the second participant subset is participating during a second time includes accessing timestamps stored in association with the recording. The timestamps indicate the first time and the second time.

In some embodiments, determining that the first participant subset is participating during the first time and the second participant subset is participating during a second time includes, during the communication session, tracking when endpoints of the participants join and leave the communication session to identify the first time and the second time.

In some embodiments, determining that the first participant subset is participating during the first time and the second participant subset is participating during a second time includes processing the user communications to determine the first time based on when the first participant subset is communicating therein and to determine the second time based on when the second participant subset is communicating therein.

In some embodiments, the method includes determining a context of the user communications during the first time and identifying a non-participant user, not included in the first participant subset, that is an interested party with respect to the context.

In some embodiments, the method includes, upon receiving a request, from an endpoint of the non-participant user, to access a recording of the user communications, providing, to the endpoint, the first portion of the recording.

In some embodiments, receiving user input from a host of the communication session indicating users allowed to access all of the recording.

In another embodiment, an apparatus is provided having one or more computer readable storage media and a processing system operatively coupled with the one or more computer readable storage media. Program instructions stored on the one or more computer readable storage media, when read and executed by the processing system, direct the apparatus to access a recording of user communications exchanged between participants over a communication session. The program instructions further direct the apparatus to determine that a first participant subset of the participants is participating over the communication session during a first time and a second participant subset of the participants is participating over the communication session during a second time. A first user included the first participant subset is not included in the second participant subset. The program instructions also direct the apparatus to, upon receiving a request for the first user to access the recording, provide, to a first endpoint of the first user, a first portion of the recording corresponding to the first time and prevent access to a second portion of the recording corresponding to the second time.

DETAILED DESCRIPTION

The recording access systems described below control who is able to access portions of a recording of a communication session rather than simply controlling access to the recording as a whole. This enables a single communication session to be recorded even when participants join and leave during the communication session. Each participant is allowed access to a portion of the communication session that they attended and is prevented from accessing portions of the communication session from which they were absent. For example, a supervisor may use a communication session to speak with the employees working under them. When the supervisor is finished speaking to one employee, that employee can leave the communication session and a next employee can join. If the supervisor intends each conversation to be private, the supervisor will likely not want all employees who joined the call to access the entire recording. As such, the recording access systems herein provide to a participant only a portion of the recording that corresponds to when the participant was joined to the communication session. The recording access systems prevent the participant from accessing other portions of the recording. Advantageously, the supervisor would not have to schedule multiple communication sessions, one for each employee, in order to provide a recording to each employee that is not accessible by the other employees.

Figure 1:
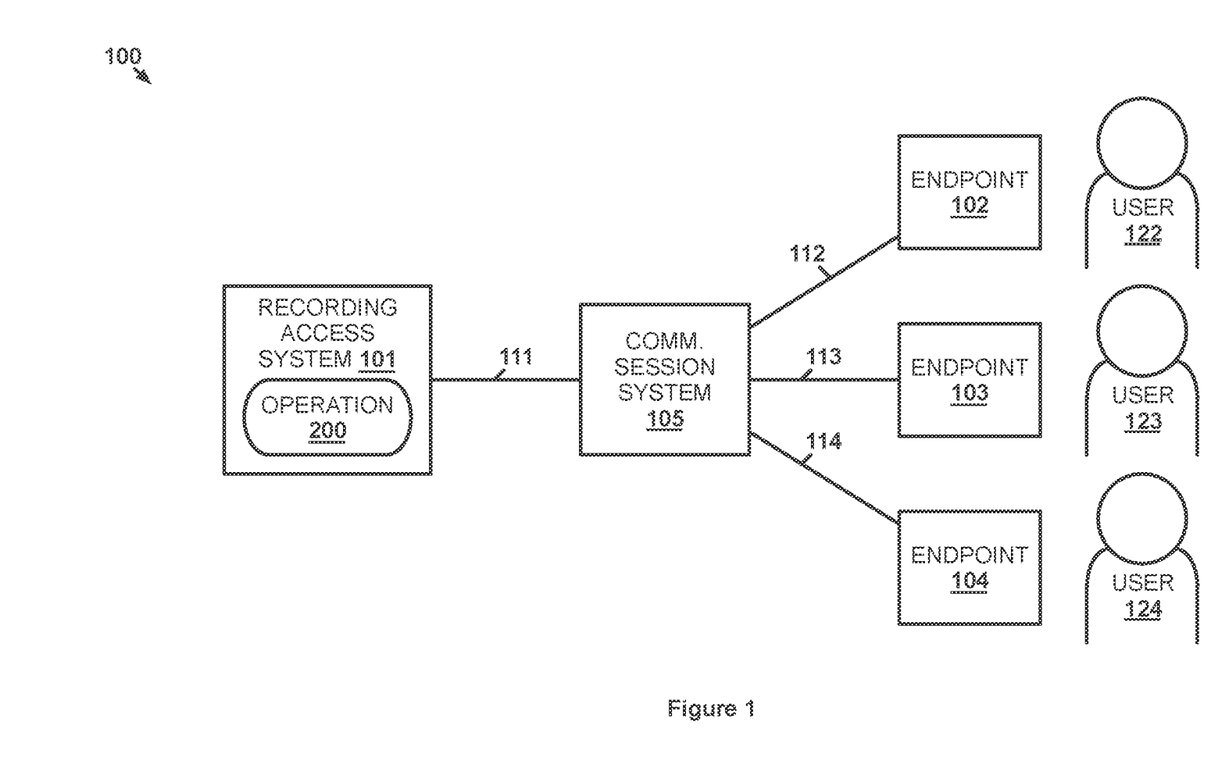
FIG. 1 illustrates an implementation for controlling access to portions of a communication session recording.

FIG. 1 illustrates implementation 100 for controlling access to portions of a communication session recording. Implementation 100 includes recording access system 101, endpoints 102-104, and communication session system 105. Users 122-124 operate endpoints 102-104, respectively. Recording access system 101 and communication session system 105 communicate over communication link 111. Endpoint 102 and communication session system 105 communicate over communication link 112. Endpoint 103 and communication session system 105 communicate over communication link 113. Endpoint 104 and communication session system 105 communicate over communication link 114. Communication links 111-114 are shown as direct links but may include intervening systems, networks, and/or devices. Likewise, communication links between one or more of endpoints 102-104 and recording access system 101 may exist that enable endpoint 102-104 to communicate with recording access system 101 without communication session system 105 in the signal path.

Figure 2:
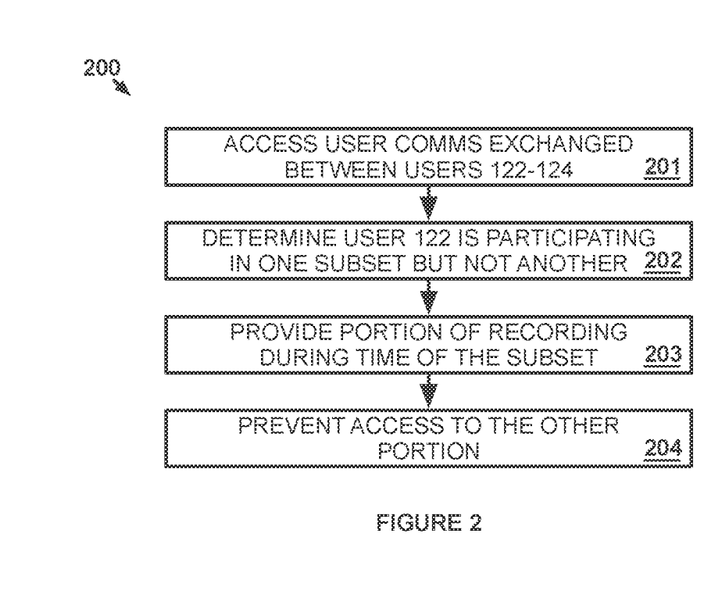
FIG. 2 illustrates an operation to control access to portions of a communication session recording.

In operation, endpoints 102-104 may each respectively be a telephone, tablet computer, laptop computer, desktop computer, conference room system, or some other type of computing device capable of connecting to a communication session facilitated by communication session system 105—including combinations thereof. Communication session system 105 facilitates communication sessions between two or more endpoints, such as endpoints 102-104. A communication session may be audio only (e.g., a voice call) or may also include a video component (e.g., a video call), a graphic component (e.g., presentation slides, screen sharing, etc.), text chat component, and/or some other type of real-time communication. During a communication session, users 122-124 are able to communicate with one another in real time by way of their respective endpoints 102-104 capturing user communications therefrom (e.g., the users' voices, video images, text input, etc.). After a communication session, recording access system 101 is able to access user communications, and potentially other types of media (e.g., screen sharing, presentation slides, etc.) that were exchanged over the communication session. For example, recording access system 101 may have had access to the communication session during the communication session to generate a recording of the communication session or communication session system 105 may have generated the recording and made the recording accessible to recording access system 101 (e.g., may have stored the recording in a storage volume accessible by recording access system 101). Regardless, recording access system 101 performed operation 200, as described below to allow access to portions of the recording to users 122-124 should one of them request the recording. While shown as distinct systems, recording access system 101 and communication session system 105 may be incorporated into a single system. That combined system may, therefore, be a platform that provides both communication session services and access to recordings of those sessions.

FIG. 2 illustrates operation 200 to control access to portions of a communication session recording. In operation 200, recording access system 101 accesses a recording of user communications exchanged between users 122-124 over a communication session (201). Users 122-124 are participants on the communication session but, in this case, are not all joined to the communication session at the same time for the entirety of the communication session. For example, user 123 may join late and/or user 124 may jump off early. The user communications include media captured from users 122-124, such as audio (e.g., voice), video, or some other type of communication media that enables users 122-124 to communicate with one another while participating over the communication session. The recording may be stored locally at recording access system 101, may be stored in a system that generated the recording if not recording access system 101 (e.g., communication session system 105 or a dedicated recording system), may be stored in a network attached storage system, or may be stored in some other location accessible to recording access system 101. Recording access system 101 may access the recording after the recording has been completed or may access the recording while generation of the recording is in progress (e.g., while the communication session is ongoing).

Recording access system 101 determines that a subset of the participants is participating over the communication session during one time and another subset of the participants is participating over the communication session during another time (202). The two subsets may include any combination of users 122-124 with user 122, in this example, being included in only one of the two subsets. For instance, user 122 may join the communication session via endpoint 102 and then drop off before the communication session ends so that user 123 and user 124 can continue talking without user 122 present. In other examples, the two subsets mentioned here may be two of more subsets that participate over the communication session at various times.

Recording access system 101 may determine which participants are participating over the communication session at any given time by determining when each participant joins and leaves the communication session. Communication session system 105 may indicate who is currently participating in the communication session over the course of the session. If a user is participating using a soft client executing on their endpoint, the soft client may display a participant list of the participants currently participating. Whichever system generated the recording of the communication session (e.g., recording access system 101 itself) may, therefore, track who is added to and removed from the participant list during the course of the communication session and store timestamps indicating when in the recording participants join and leave. The timestamps may be stored in metadata of the recording file itself or may be stored separately in association with the recording for access by recording access system 101. Recording access system 101 may also determine who is participating in a communication session by analyzing the user communications in the recording. Analysis of the user communications themselves may indicate to recording access system 101 who is participating in the communication session even when information associated with the recording (e.g., the timestamps above) are unavailable or cannot detect every participant. For example, if more than one participant joins from the same endpoint, then communication session system 105 may not be able to tell who all is joined from that endpoint (e.g., if user 123 and user 124 both join from endpoint 103, then communication session system 105 may only recognize user 123 as being a participant even though user 124 is there as well). The user communications may be analyzed for voices of participants (e.g., comparing voices in the user communications to known voice signatures), for video/photos of participants (e.g., using facial recognition), for words being spoken (e.g., one participant may refer to another participant by name to identify the participant when the participant joins or participants may say goodbye to a participant that is leaving to indicate that the participant has left), for tones in the user communications supplied by communication session system 105 when a participant joins or leaves, or for some other indicator of who may be participating at any given time during the communication session. Recording access system 101 may also cross reference invitees to the conference session to increase certainty in its determination that the participant is who recording access system 101 has determined them to be (e.g., identifying a user as a participant from the user communications may be confirmed by that user being listed in the invitees for the session). Other manners of determining when particular users are participating in the communication session may also be used.

Upon receiving a request from endpoint 102 for user 122 to access the recording of the user communications, recording access system 101 provides endpoint 102 with the portion of the recording that corresponds the time in which user 122 is participating over the communication session (203). User 122 may use endpoint 102 to log into recording access system 101 to request the recording (e.g., may use a client application or web-based interface into recording access system 101), although other manners of communicating the request to recording access system 101 may also be used. Even if the request asks for the recording in its entirety, recording access system 101 has determined above that user 122 was only participating in the communication session for a particular time. Therefore, recording access system 101 only transmits the portion of the recording that captured that particular time to endpoint 102 in response to the request. The time may be defined based on a time of day in which user 122 joined the communication session and a time of day when user 122 left the communication session (e.g., user 122 joined at 12:05 pm and left at 12:33 pm). The time may also be defined based on the run time of the communication session (e.g., user 122 joined when the session started and left 24 minutes into the session). The time in which user 122 was on the communication session, regardless of how that period is defined, is provided as the recording to endpoint 102 for playback, or other use, by user 122. The portion of the recording may be transmitted to endpoint 102 as a file for local storage at endpoint 102, may be streamed to endpoint 102 for real-time playback of the received stream, or may be provided in some other manner.

In some examples, the request may come from endpoint 102 prior to the portion being available. For instance, user 122 may indicate that they want a recording of the communication session prior to the session even starting. Endpoint 102 may, therefore, transmit the request to recording access system 101 before the session starts and recording access system 101 may then automatically provide the portion of the recording when user 122 completes their participation in the communication session. Similarly, the request may not be received from user 122 via an endpoint thereof. Rather, another user, such as a host or moderator of the communication session may request via their own endpoint that recording access system 101 provide session participants with recording portions corresponding to each user's time participating in the communication session.

Recording access system 101 also prevents endpoint 102 from accessing the portion of the recording where user 122 is not in the subset of users participating over the communication session (204). Preventing access may be as simple as not providing anything but the portion of the recording that is provided above. However, in some examples, endpoint 102 may be able to request other portions and recording access system 101 may deny that request. A host or moderator of the communication session may have indicated their preference to limit user 122's access to only those portions of the recording in which user 122 was a participant or recording access system 101 may implement that limitation by default to all users. In that latter example, the host or moderator may override the default to allow certain users access to the entire recording.

Advantageously, even though only one communication session took place and only one recording was made of that communication session, every participant on the communication session is not able to access the entire recording. Separate communication sessions need not be established to communicate with each distinct subset of participants to ensure recordings thereof can only be shared with the corresponding subset. Rather, recording access system 101 can effectively partition the recording after the fact between distinct subsets of participants.

Figure 3:
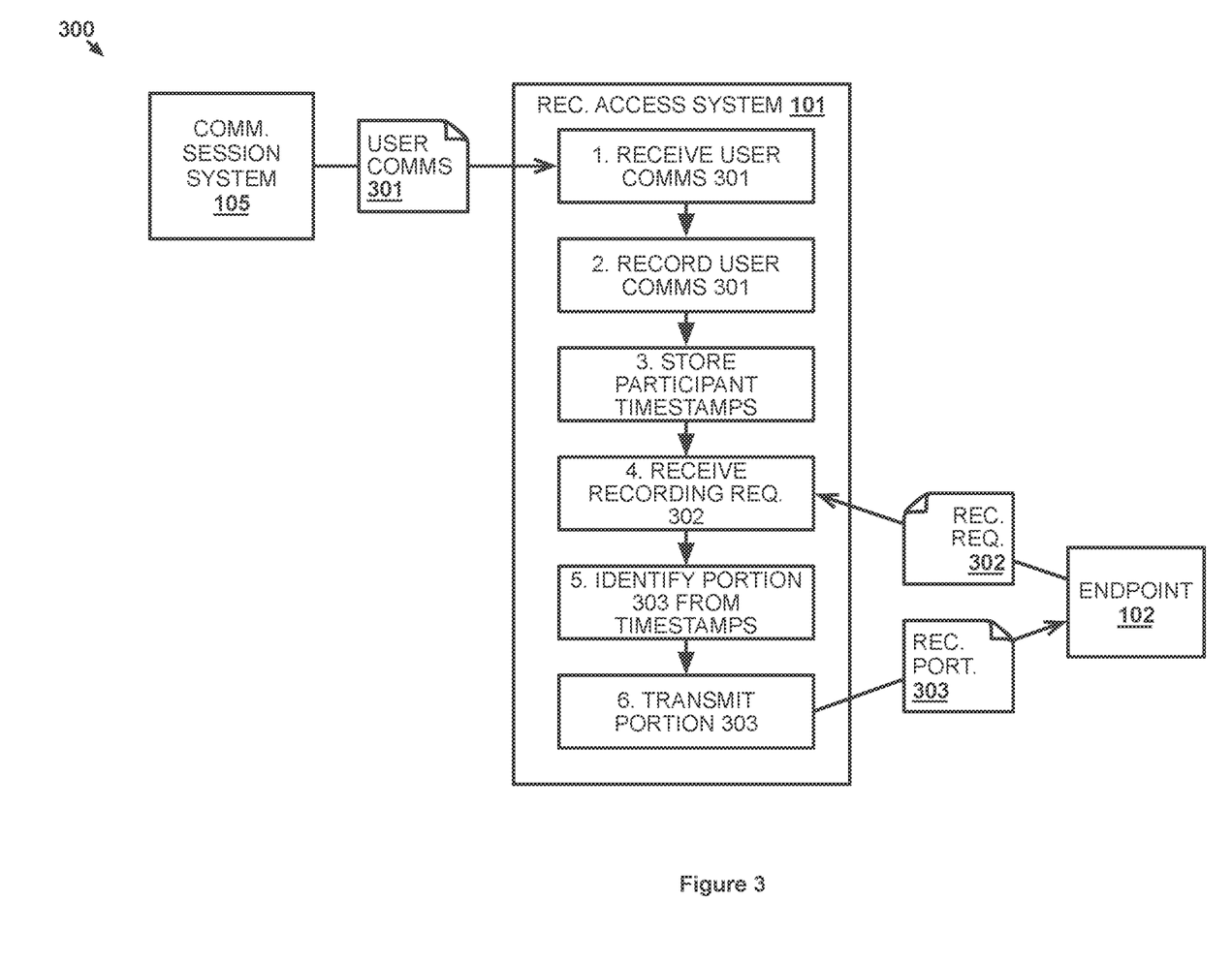
FIG. 3 illustrates an operational scenario for controlling access to portions of a communication session recording.

FIG. 3 illustrates operational scenario 300 for controlling access to portions of a communication session recording. Operational scenario 300 is an example of how recording access system 101 may operate when performing operation 200. In operational scenario 300, recording access system 101 connects to communication session system 105 during the communication session to, at step 1, receive user communications 301 that are exchanged between users 122-124 via their endpoints 102-104. User communications 301 may include voice and/or video communications captured from users 122-124. Recording access system 101 records user communications 301 at step 2 by storing a recording to a storage system within recording access system 101 or otherwise accessible by recording access system 101. The recording may only include user communications 301 or may include other types of media (e.g., screen sharing, presentation slides, etc.) shared over the communication session. The recording may be stored as a video or audio file in a standardized format (e.g., a format that can be played back by most common media player applications) or may be stored in a format proprietary to recording access system 101 and client applications on endpoints to interact with recording access system 101.

In this example, recording access system 101 stores timestamps indicating when each of user 122 are joined to the communication session at step 3. Communication session system 105 may provide information with indications of who is joined to the communication session at any given time during the communication session (e.g., to display the participant's name/identifier in a participants list). Recording access system 101 may use that information to store timestamps of times in the recording that correspond to when each participant is joined to the communication session. For instance, the timestamps may indicate each point when the participants change (e.g., a participant joins or leaves) and indicate who is joined to the session after the change. The timestamps may be stored in association with, but separately from, the recording (e.g., in a separate file) or may be stored as part of the recording itself (e.g., as metadata within the recording file). Types of information other than timestamps may also be used to indicate to recording access system 101 which users are participating in the communication session at any given time during the communication session.

Recording access system 101 receives recording request 302 at step 4 from endpoint 102 to request access to the recording of the communication session in which user 122 was a participant. In one example, user 122 operates a client application executing on endpoint 102 that enables user 122 to access features provided by recording access system 101. The client application may be the same application that user 122 used to participate in the communication session or may be a different application. User 122 may indicate to the client application that user 122 wishes to obtain the recording of the communication session, which directs endpoint 102 to transmit recording request 302 to recording access system 101. As such, recording request 302 may be a message complying with an Application Programming Interface (API) call of recording access system 101 to request recordings. Other manners of requesting data may also be used to indicate to recording access system 101 that endpoint 102 is requesting the data that represents the recording of the communication session. In some examples, the communication session must have concluded before a recording of the communication session can be requested and/or before the recording can be provided to endpoint 102. In other examples, endpoint 102 may be allowed to request and be provided with user 122's portion of the recording prior to the communication session ending. For example, if user 122 leaves the communication session prior to the session ending (i.e., the session continues with other participants), then recording access system 101 may allow endpoint 102 to request user 122's portion of the recording since the recording of user 122's portion is complete. In this example, user 122 requests the recording via the same endpoint, endpoint 102, that user 122 used to attend the communication session. In other examples, user 122 may request the recording from a different endpoint system (e.g., may participate using their laptop and request the recording via their phone).

Rather than provide the entirety of the recording to endpoint 102 in response to recording request 302, recording access system 101 identifies recording portion 303 at step 5 from the timestamps stored in association with the recording. Specifically, the timestamps indicate that recording portion 303 is a recording of the communication session encompassing the time in which user 122 was participating in the communication session. Recording portion 303 may be one continuous portion of the overall recording of the communication session or may include multiple non-contiguous segments of the overall recording. For example, user 122 may leave the communication session at one point and then rejoin the communication session a while later. Recording access system 101 may, therefore, identify both periods in which user 122 was participating as being the time in which user 122 was participating and stitch the two segments of the overall recording together to generate recording portion 303.

Recording access system 101 then transmits the identified recording portion 303 at step 6 to endpoint 102. Upon receiving recording portion 303, endpoint 102 may automatically begin playback of recording portion 303 to present recording portion 303 to user 122 or may store recording portion 303 for playback at a later time or for some other purpose. Even if user 122 thought they were requesting the overall recording of the entire communication session, recording access system 101 prevents user 122 from accessing the portion of the overall recording in which user 122 was not a participant by only sending recording portion 303. Recording request 302 may include only the portion of user communications 301 during which user 122 was a participant on the communication session or may also include any additional media being shared over the communication session (e.g., presentation slides). In some examples, recording access system 101 may omit a component of the user communications 301 during which user 122 was a participant depending on session host/moderator preferences and/or device capabilities. For example, even if the communication session was a video call, the host of the call may indicate that only audio be supplied in response to recording requests. In such examples, recording access system 101 may not record the video component at all or may simply omit the video component when providing recording portion 303.

Figure 4:
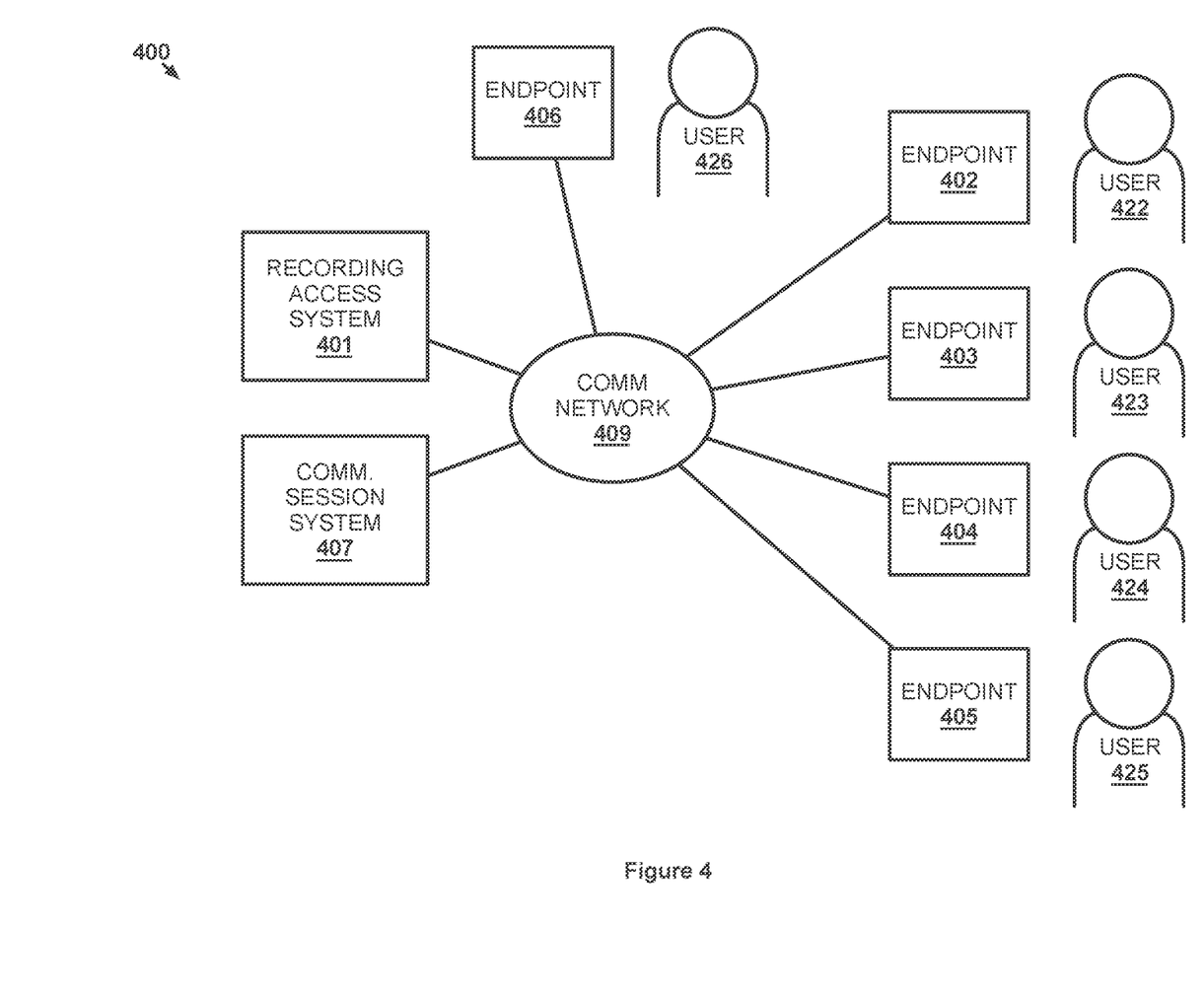
FIG. 4 illustrates an implementation for controlling access to portions of a communication session recording.

FIG. 4 illustrates implementation 400 for controlling access to portions of a communication session recording. Implementation 400 includes recording access system 401, endpoints 402-406, communication session system 407, and communication network 409. Communication network 409 includes one or more local area networks and/or wide area computing networks, including the Internet, over which systems 401-407 communicate. Endpoints 402-406 may respectively comprise a telephone, laptop computer, desktop workstation, tablet computer, conference room system, or some other type of user operable computing device. Endpoints 402-406 are operated by users 422-426, respectively. Communication session system 407 may be an audio/video conferencing server, a packet telecommunications server, a web-based presentation server, or some other type of computing system that facilitates user communication sessions between endpoints. Endpoints 402-405 may each execute a client application that enables endpoints 402-405 to join communication sessions facilitated by communication session system 407. Endpoint 406 may also execute the client application but user 426 is not a participant in the examples below. Endpoints 402-405 may join communication sessions in other manners, such as dialing in over the public telephone network, in some examples. Recording access system 401 is a server that communicates with communication session system 407 to record communication sessions facilitated thereby. Recording access system 401 may record all communication sessions established by communication session system 407 or may record only a portion of the communication sessions, such as those when a host/moderator of the communication session requests that the session be recorded. Recording access system 401 further provides access to those recordings, as described below.

Figure 5:
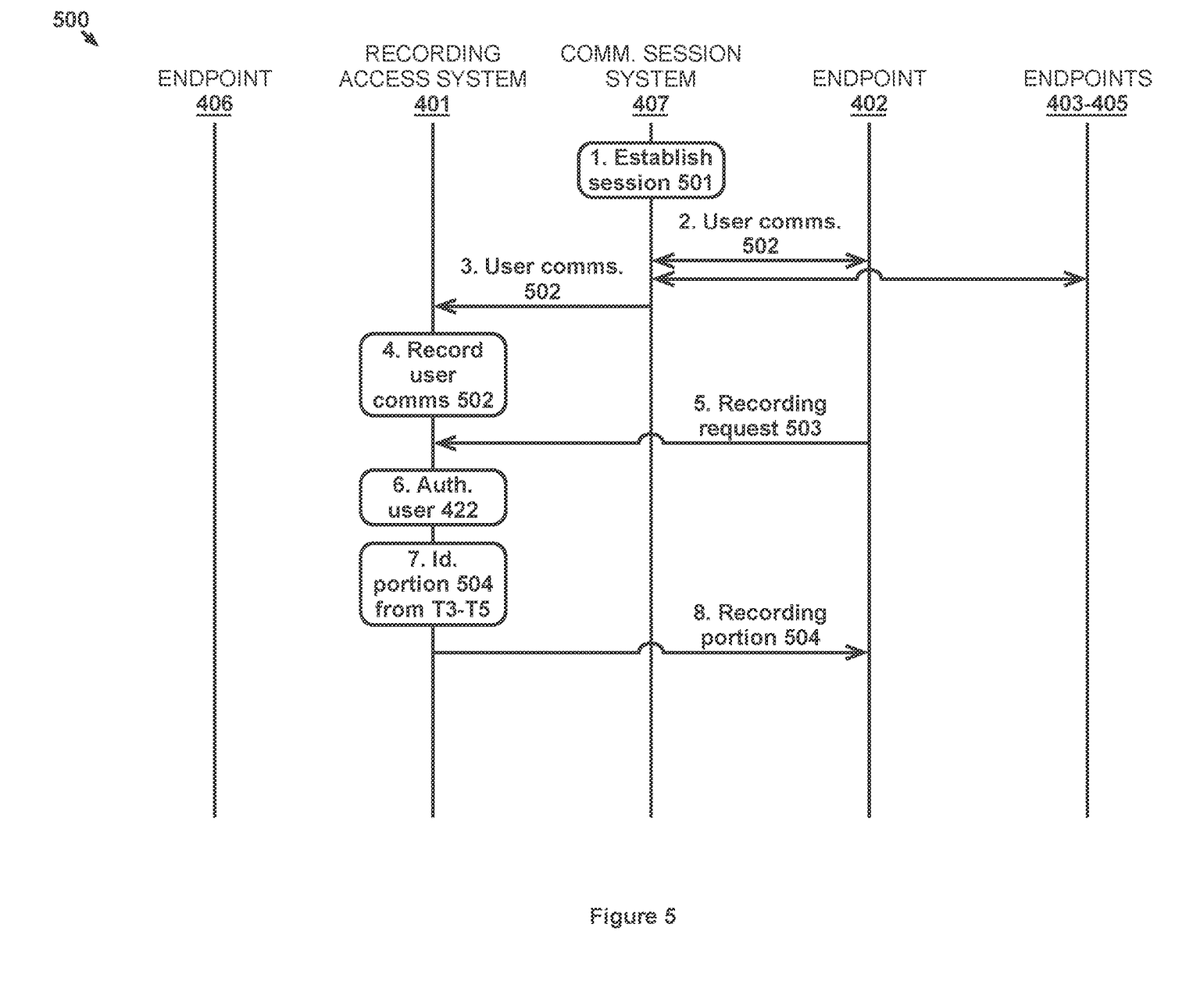
FIG. 5 illustrates an operational scenario for controlling access to portions of a communication session recording.

FIG. 5 illustrates operational scenario 500 for controlling access to portions of a communication session recording. In operational scenario 500, communication session system 407 establishes communication session 501 at step 1. Communication session 501 is a communication session in which users 422-425 will each participate at some point but, at least in this example, users 422-425 are not all participating for the entire duration of communication session 501. After establishing communication session 501, communication session system 407 facilitates the exchange of user communications 502 over communication session 501 at step 2. User communications 502 may include voice and/or video communications captured from users 422-425 via their respective endpoints 402-405 (e.g., using cameras and/or microphones thereat) over the course of communication session 501. As noted above, since endpoints 402-405 are not all connected to communication session 501 (and users 422-425 are not joined to communication session 501 accordingly) for the entirety of communication session 501, it should be understood that user communications 502 at any given time can only include user communications captured from those endpoints currently connected to communication session 501.

Figure 6:
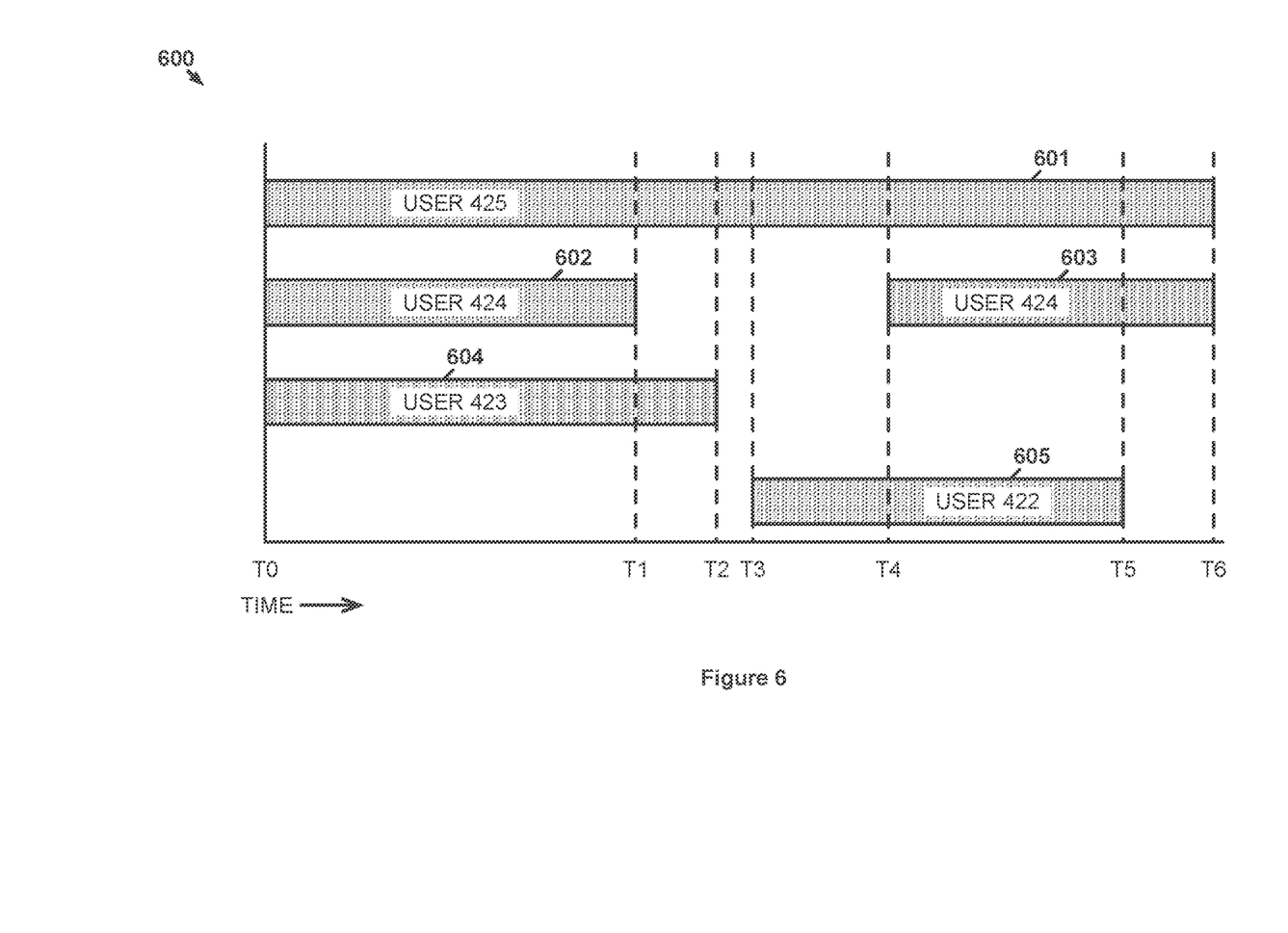
FIG. 6 illustrates a timeline for controlling access to portions of a communication session recording.

In addition to being exchanged between endpoints connected to communication session 501, user communications 502 are transferred to recording access system 401 at step 3. Recording access system 401 may receive user communications 502 in real-time as they occur over communication session 501 or communication session system 407 may transmit user communications 502 to recording access system 401 on some other schedule. Upon receipt of user communications 502, recording access system 401 records user communications 502 at step 4 to generate a recording of communication session 501. While generating user communications 502, recording access system 401 tracks who of users 422-425 are participating at times during the communication session 501 and stores information indicating who is participating at what times in association with the recording. The information for this example is represented by timeline 600 described below.

FIG. 6 illustrates timeline 600 for controlling access to portions of a communication session recording. Timeline 600 is an example showing when during communication session 501 each of users 422-425 are participating over communication session 501. The information stored by recording access system 401 in association with the recording of communication session 501 may information representing that portrayed by timeline 600. In this example, participation bar 601 represents the time in which user 425 is participating over communication session 501. Participation bars 602 and 603 represent the time in which user 424 is participating over communication session 501. Participation bar 604 represent the time in which user 423 is participating over communication session 501. Participation bar 605 represents the time in which user 422 is participating over communication session 501.

According to timeline 600, communication session 501 starts at time instance T0 and time elapses during communication session 501 as the viewer moves to the right. At time instance T0, user 425, user 424, and user 423 are joined to, and participating over, communication session 501. Come time instance T1, user 424 leaves communication session 501 (e.g., user 424 directed endpoint 404 to disconnect from communication session system 407). At time instance T2, user 423 also leaves communication session 501. User 425 is the only user on communication session 501 until time instance T3 when user 422 joins communication session 501. Then, at time instance user 424 rejoins communication session 501 with user 425 and user 422. User 422 leaves communication session 501 at time instance T5. User 425 and user 424 then remain on communication session 501 until communication session 501 ends at time instance T6. Timeline 600, therefore, shows which subset of users 422-425 are participating in communication session 501 at any given time. In some examples, all of users 422-425 may be participating in communication session 501 at the same time for a portion of communication session 501. As such, the subset may include all users for certain portions.

In one example of the information stored by recording access system 401 in association with the recording of communication session 501, each of the time instances on timeline 600 may be represented as timestamps. For instance, the timestamp for time instance T0 may indicate that users 423-425 are participating in communication session 501. A timestamp for time instance T1 may then indicate that user 424 dropped and rely on recording access system 401 keep track of the fact that user 424 and user 425 remain. Alternatively, the timestamp may simply indicate user 424 and user 425 are still participating at T1. Timestamps for the remaining time instances T2-T6 may similarly indicate changes to the participants at that time or may indicate who is currently participating at the time.

In alternative examples, recording access system 101 may store information that indicates when each user was participating. For instance, recording access system 101 may store metadata indicating that user 425 was participating from T0-T6, user 424 was participating from T0-T1 and then from T4-T6, user 423 was participating from T0-T2, and user 422 was participating from T3-T5. Alternative manners of representing who is participating in communication session 501 at what times may also be used by recording access system 101.

Referring back to operational scenario 500, recording access system 401 receives recording request 503 at step 5 from endpoint 402. Recording request 503 requests the recording of communication session 501. Before providing any portion of the recording, recording access system 401 authenticates user 422 at step 6 to determine whether user 422 is authorized to receive at least a portion of the recording. User 122 may authenticate themselves using access credentials, such as a username and password combination, that may be provided to recording access system 401 at the time of recording request 503 (consistent with the position of step 6 in the sequence of operational scenario 500) or may be provided at some other time (e.g., when user 122 first logs into a client application that interacts with recording access system 401). Recording access system 401 may simply identify user 422 as having been a participant in communication session 501 to determine that user 422 is authorized and/or may use other information. For instance, user 425 may be the host of communication session 501 and may provide instructions regarding which users are allowed to received recordings. While user 422 in this example is only allowed to receive a portion of the recording of communication session 501 in which user 422 was participating, user 425 may instruct recording access system 401 to allow user 422 to receive more than just that portion in other examples.

After authenticating user 422, recording access system 401 identifies recording portion 504 at step 7 as being the portion of the recording that corresponds to when user 422 was participating in communication session 501. As shown on timeline 600, user 422 is participating at the time between time instances T3 and T5. As such, to create recording portion 504, recording access system 401 copies the user communications (or any other media that may be applicable) in the recording between T3 and T5. Recording portion 504, therefore, only includes the copied user communications between T3 and T5. If user 425, as the host, had instructed recording access system 401 to allow user 422 to receive more than just the portion of communication session 501 in which user 422 was participating, then recording access system 401 would include some or all of user communications outside of T3-T5 based on user 425's instructions.

After generating recording portion 504, recording access system 401 transmits recording portion 504 at step 8 to endpoint 402 in compliance with recording request 503. In this example, the entirety of recording portion 504 is transmitted (e.g., to allow playback at a later time) while, in other examples, recording request 503 may be streamed for streaming playback at endpoint 402. In examples where recording portion 504 is streamed, endpoint 402 may communicate instructions received from user 422 to adjust the playback (e.g., to pause, rewind, speed up, or otherwise manipulate the playback). Since endpoint 402 only receives recording portion 504, recording access system 401 has prevented endpoint 402 from receiving portions of the recording of communication session 501 outside of recording portion 504.

Figure 7:
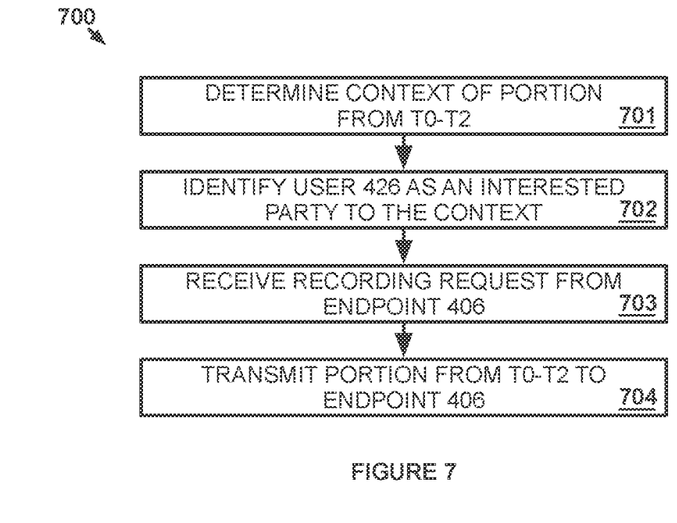
FIG. 7 illustrates an operation to control access to portions of a communication session recording.

In some examples, recording portion 504 may also be provided to other participants in the subset of participants that participated during recording portion 504 (i.e., user 424 and user 425). Although, since user 424 is not a participant for the entirety of the portion, user 424 may instead receive their own portion of the recording of communication session 501 corresponding to when they are actually participating. In some cases, context may be used to determine whether a user's portion extends beyond the time when the user is actually participating on communication session 501. For example, similar to what occurs during operation 700 below, recording access system 401 may determine that, even though user 424 was not present for a portion of recording portion 504, user 424 is an interested party to the entirety of recording portion 504. The entirety of recording portion 504 may, therefore, still be provided to user 424 via endpoint 404 (potentially along with other segments of the recording in which user 424 is a participant, such as T0-T1, or is an interested party).

While the above example focused on user 422 requesting the recording of communication session 501, a similar process would occur in response to another user, such as user 423, requesting the recording. In user 423's case, they are part of the participant subset that is participating on communication session 501 between T1 and T3. Recording access system 401 would provide user 423 only with the portion of the recording between T1 and T3 (unless otherwise instructed to provide some other portion by the host). User 423 and user 422 are provided with their respective portions while recording access system 401 prevents them from accessing each other's portions.

FIG. 7 illustrates operation 700 to control access to portions of a communication session recording. Operation 700 is an example operation that may be performed by recording access system 401 to determine whether non-participant users (i.e., users that did not participate in a portion of the recording) can also be provided with at least a portion of the recording. A non-participant user may not have participated in communication session 501 at all or may have not been a participant in the portion of the recording that is provided to the non-participant user. In operation 700, recording access system 401 determines a context of the portion of communication session 501 that occurs between T0 and T2 on timeline 600 (701). The context may include a topic being discussed between users 423-425 during the portion, a question(s) asked during the session, a presentation slide(s) shown during the session, an attribute(s) of users 423-425 (e.g., role in the company), whether user 426 was originally invited to communication session 501 but could not attend, or some other factor indicative of whether another party may be interested in the portion—including combinations thereof.

After determining the context, recording access system 401 determines that user 426 is an interested party to the portion based on the context (702). User 426 may be an interested party due to user 426 having duties (e.g., position with the company) that are relevant to the context determined for the portion. For example, the topic being discussed during the portion may be related to a project that user 426 manages. Recording access system 401, therefore, determines that user 426 is an interested party to the portion. Recording access system 401 may notify user 426 by sending a notification message to endpoint 406 indicating that user 426 has been determined to be an interested party to a portion of a communication session. In some examples, the host of communication session 501 may be required to indicate that recording access system 401 is allowed to transmit portions of the recording to interested parties that did not attend a respective portion.

In some examples, recording access system 401 may simply generate and transmit the portion to endpoint 406. In this example, recording access system 401 receives a request for the recording from endpoint 406 (703). In response to the request, recording access system 401 provides endpoint 406 with the portion of the recording corresponding to the time between T0 and T2 (704). Recording access system 401 does not provide endpoint 406 with any portion of the recording outside of provided portion to prevent user 426 from having access to a portion of the recording in which user 426 is not an interested party.

While the context of only one portion is discussed above, operation 700 may also determine contexts of other portions of the recording of communication session 501 and determine whether there are any interested parties to those portions. Likewise, the example used to describe operation 700 delineates portions of the recording based on the time instances shown in timeline 600. Recording access system 401 may not be limited to delineating portions of the recording based on those time instances but, instead, may be able to generate additional time instances indicating when the context changes from one context to another. For example, the context may change at least once in between T0 and T2 rather than that period of time having the same context throughout.

Figure 8:
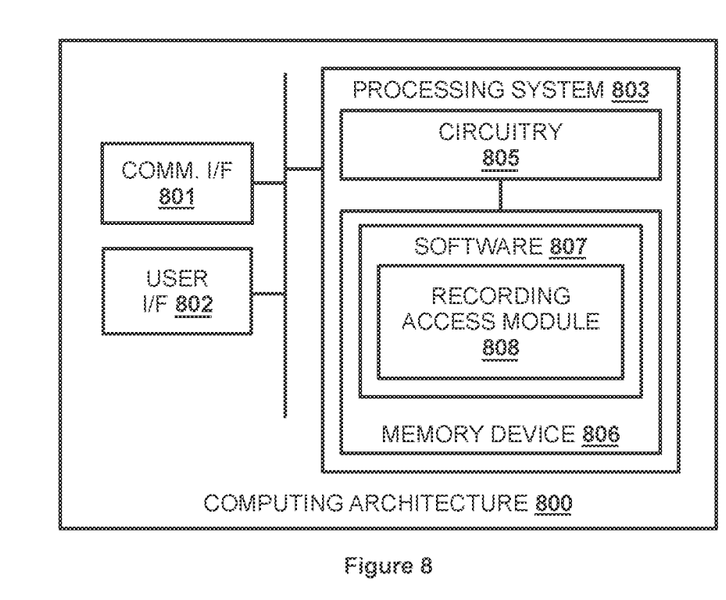
FIG. 8 illustrates a computing architecture for controlling access to portions of a communication session recording.

FIG. 8 illustrates computing architecture 800 for controlling access to portions of a communication session recording. Computing architecture 800 is an example computing architecture for recording access systems 101 and 401, although systems 101 and 401 may use alternative configurations. Other systems described above, such as the endpoints and communication session systems, may also use computing architecture 800. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a computer readable storage medium of memory device 806, or any other computer readable storage medium herein, be considered a transitory form of signal transmission (often referred to as "signals per se"), such as a propagating electrical or electromagnetic signal or carrier wave. Operating software 807 comprises computer programs, firmware, or some other form of machine-readable processing instructions. Operating software 807 includes recording access module 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, recording access module 808 directs processing system 803 to access a recording of user communications exchanged between participants over a communication session. Recording access module 808 further directs processing system 803 to determine that a first participant subset of the participants is participating over the communication session during a first time and a second participant subset of the participants is participating over the communication session during a second time. A first user included the first participant subset is not included in the second participant subset. Recording access module 808 directs processing system 803 to, upon receiving a request for the first user to access the recording, provide, to a first endpoint of the first user, a first portion of the recording corresponding to the first time and prevent access to a second portion of the recording corresponding to the second time.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
accessing a recording of user communications exchanged between participants over a communication session;
determining from the recording that a first participant of the participants was joined to the communication session during a first time but not during a second time when one or more others of the participants are joined to the communication session, wherein a first portion of the recording corresponds to the first time and is distinct from a second portion of the recording that corresponds to the second time; and
upon receiving a request for the first participant to access the recording, preventing the first participant from accessing portions of the recording corresponding to when the first participant was not joined to the communication session, wherein preventing the first participant from accessing the portions includes providing the first portion, but not the second portion, to a first endpoint of the first participant.

2. The method of claim 1, wherein a second participant was joined to the communication session during the second time but not during the first time, and the method comprising:
upon receiving a request, from a second endpoint of the second participant, preventing the second participant from accessing second portions of the recording corresponding to when the second participant was not joined to the communication session, wherein preventing the second participant from accessing the second portions includes providing the second portion, but not the first portion, to the second endpoint.

3. The method of claim 1, wherein a third participant was joined to the communication session during the first time and the second time, and the method comprising:
upon receiving a request, from a third endpoint of the third participant, providing the first portion and the second portion to the third endpoint.

4. The method of claim 1, comprising:
authenticating the first participant prior to providing the first portion.

5. The method of claim 1, wherein determining that the first participant was joined to the communication session during the first time but not during the second time comprises:
accessing timestamps stored in association with the recording, wherein the timestamps indicate the first time and the second time.

6. The method of claim 1, wherein determining that the first participant was joined to the communication session during the first time but not during the second time comprises:
during the communication session, tracking when endpoints of the participants join and leave the communication session to identify the first time and the second time.

7. The method of claim 1, wherein determining that the first participant was joined to the communication session during the first time but not during the second time comprises:
processing the user communications to determine the first time based on when the first participant is communicating in the user communications.

8. The method of claim 1, comprising:
determining a context of the user communications during the first time; and
identifying a non-participant user, not joined to the communication session during the first time, that is an interested party with respect to the context.

9. The method of claim 8, comprising:
upon receiving a request, from an endpoint of the non-participant user, to access the recording, providing, to the endpoint, the first portion.

10. The method of claim 1, comprising:
receiving user input from a host of the communication session indicating users allowed to access all of the recording.

11. An apparatus comprising:
one or more computer readable storage media;
a processing system operatively coupled with the one or more computer readable storage media; and program instructions stored on the one or more computer readable storage media that, when read and executed by the processing system, direct the apparatus to:
    access a recording of user communications exchanged between participants over a communication session;
    determine that a first participant of the participants was joined to the communication session during a first time but not during a second time when one or more others of the participants are joined to the communication session, wherein a first portion of the recording corresponds to the first time and is distinct from a second portion of the recording that corresponds to the second time; and
    upon receiving a request for the first participant to access the recording, prevent the first participant from accessing portions of the recording corresponding to when the first participant was not joined to the communication session, wherein the first participant is prevented from accessing the portions by providing the first portion, but not the second portion, to a first endpoint of the first participant.

12. The apparatus of claim 11, wherein a second participant was joined to the communication session during the second time but not during the first time, and wherein the program instructions direct the apparatus to:
    upon receiving a request, from a second endpoint of the second participant, prevent the second participant from accessing second portions of the recording corresponding to when the second participant was not joined to the communication session, wherein the second participant is prevented from accessing the second portions by providing the second portion, but not the first portion, to the second endpoint.

13. The apparatus of claim 11, wherein a third participant was joined to the communication session during the first time and the second time, and wherein the program instructions direct the apparatus to:
    upon receiving a request, from a third endpoint of the third participant, providing the first portion and the second portion to the third endpoint.

14. The apparatus of claim 11, wherein the program instructions direct the apparatus to:
    authenticate the first participant prior to providing the first portion.

15. The apparatus of claim 11, wherein to determine that the first participant was joined to the communication session during the first time but not during the second time, the program instructions direct the apparatus to:
    access timestamps stored in association with the recording, wherein the timestamps indicate the first time and the second time.

16. The apparatus of claim 11, wherein to determine that the first participant was joined to the communication session during the first time but not during the second time, the program instructions direct the apparatus to:
    during the communication session, track when endpoints of the participants join and leave the communication session to identify the first time and the second time.

17. The apparatus of claim 11, wherein to determine that the first participant was joined to the communication session during the first time but not during the second time, the program instructions direct the apparatus to:
    process the user communications to determine the first time based on when the first participant is communicating in the user communications.

18. The apparatus of claim 11, wherein the program instructions direct the apparatus to:
    determine a context of the user communications during the first time; and
    identify a non-participant user, not joined to the communication session during the first time, that is an interested party with respect to the context.

19. The apparatus of claim 18, wherein the program instructions direct the apparatus to:
    upon receiving a request, from an endpoint of the non-participant user, to access the recording, provide, to the endpoint, the first portion.

20. One or more computer readable storage media having program instructions stored thereon that, when read and executed by a processing system, direct the processing system to:
    access a recording of user communications exchanged between participants over a communication session;
    determine that a first participant of the participants was joined to the communication session during a first time but not during a second time when one or more others of the participants are joined to the communication session, wherein a first portion of the recording corresponds to the first time and is distinct from a second portion of the recording that corresponds to the second time; and
    upon receiving a request for the first participant to access the recording, prevent the first participant from accessing portions of the recording corresponding to when the first participant was not joined to the communication session, wherein the first participant is prevented from accessing the portions by providing the first portion, but not the second portion, to a first endpoint of the first participant.

* * * * *